US012770281B2

(12) United States Patent
Nygren et al.

(10) Patent No.: US 12,770,281 B2
(45) Date of Patent: Oct. 20, 2026

(54) METHODS AND SYSTEMS FOR DETERMINING 3D COORDINATES DESCRIBING A SCENE

(71) Applicant: VANTOR SWEDEN AB, Linköping (SE)

(72) Inventors: Ola Nygren, Linghem (SE); Folke Isaksson, Linköping (SE)

(73) Assignee: VANTOR SWEDEN AB, Linköping (SE)

( * ) Notice: Subject to any disclaimer, the term of this patent is extended or adjusted under 35 U.S.C. 154(b) by 692 days.

(21) Appl. No.: 18/067,657

(22) Filed: Dec. 16, 2022

(65) Prior Publication Data

US 2024/0144509 A1 May 2, 2024

(30) Foreign Application Priority Data

Nov. 1, 2022 (EP) .................................... 22204916

(51) Int. Cl.
*G06T 7/60* (2017.01)
*G06T 7/80* (2017.01)
*G06V 10/74* (2022.01)
*G06V 20/13* (2022.01)

(52) U.S. Cl.
CPC ................. *G06T 7/60* (2013.01); *G06T 7/80* (2017.01); *G06V 10/761* (2022.01); *G06V 20/13* (2022.01); *G06V 2201/07* (2022.01)

(58) Field of Classification Search
CPC ... G06T 7/60; G06T 7/80; G06T 2207/10016; G06T 2207/10032; G06T 2207/30181; G06T 7/579; G06V 10/761; G06V 20/13; G06V 2201/07
See application file for complete search history.

(56) References Cited

U.S. PATENT DOCUMENTS

2019/0179009 A1 * 6/2019 Klein .................. G01S 13/9023

OTHER PUBLICATIONS

Qin et al., "Change detection on LOD 2 building models with very high resolution spaceborne stereo imagery," ISPRS Journal of Photogrammetry and Remote Sensing, vol. 96, pp. 179-192 (Year: 2014).*

(Continued)

*Primary Examiner* — Amandeep Saini

(74) *Attorney, Agent, or Firm* — Harness, Dickey & Pierce, P.L.C.

(57) ABSTRACT

The disclosure relates to a computer implemented method for determining 3D coordinates describing a scene, obtaining first, second and third images covering the scene captured from different viewpoints, said images being associated to a timing of capture, wherein the scene is formed in an overlapping geographical area of the first, second and third images. The method further comprises determining the 3D coordinates describing the scene, said determination comprising performing bundle-adjustments based on pairwise measurements on the images to minimize a re-projection error of reconstructed 3D points in the overlapping geographical area, wherein time is used as a parameter in the determination of the 3D coordinates describing the scene, and wherein the re-projection error is minimized allowing at least a height to be locally time dependent in reconstruction of 3D points at least for a part of the overlapping geographical area.

20 Claims, 3 Drawing Sheets

(56) References Cited

OTHER PUBLICATIONS

Mari et al., "A Generic Bundle Adjustment Methodology for Indirect RPC Model Refinement of Satellite Imagery," Image Processing On Line, vol. 11, pp. 344-373 (Year: 2021).*
European Search Report issued in application No. EP 22204916.5 mailed Apr. 14, 2023 (8 pages).
Agudo Antonio et al. "Model Space: A Physics-Based Model for Sequential Estimation of Time-Varying Shape from Monocular Video"; Journal of Mathematical Imaging and Vision, Kluwer Academic Publishers, NL, vol. 57(1): 75-98 (2016).
Vo Minh et al., "Spationtemporal Bundle Adjustment for Dynamic 3D Reconstructon", IEEE Conference on Computer Vision and Pattern Recognition: 1710-1718 (2016).

* cited by examiner

METHODS AND SYSTEMS FOR DETERMINING 3D COORDINATES DESCRIBING A SCENE

This application claims benefit of European Application No. 22204916.5, filed Nov. 1, 2022, which application is incorporated herein by reference. To the extent appropriate, a claim of priority is made to the above disclosed application.

TECHNICAL FIELD

The present disclosure relates to a computer implemented method for determining three-dimensional coordinates describing a scene, a computer program, a computer program product, a device for determining three-dimensional coordinates describing a scene and a display device for display of information relating to three-dimensional coordinates describing a scene. More specifically, the disclosure relates to a computer implemented method for determining three-dimensional coordinates describing a scene, a computer program, a computer program product, a device for determining three-dimensional coordinates describing a scene and a display device for display of information relating to three-dimensional coordinates describing a scene as defined in the introductory parts of the independent claims.

BACKGROUND

A fast growing market both in civilian and military business is geographical information systems. Knowledge about geographical conditions forms a fundamental decision support to companies, authorities and in the military. The geographical information can for example comprise digital maps having superposed information layers such as infrastructure, terrain type and different types of objects.

SUMMARY OF THE INVENTION

One object of the present invention is to improve obtaining of 3D information from two-dimensional images.

This object has been achieved by means of a computer-implemented method as defined in claim 1.

Thus, according to a first aspect there is provided a computer implemented method for determining 3D coordinates describing a scene, obtaining a first image covering the scene captured from a first viewpoint, the first image being associated to a first timing of capture, obtaining a second image covering the scene captured from a second viewpoint different than the first viewpoint, the second image being associated to a second timing of capture, the second timing being different than the first timing, obtaining at least one third image covering the scene captured from a third viewpoint, the third image being associated to a third timing of capture, the third timing being different than the first and second timings, wherein the scene is formed in an overlapping geographical area of the first, second and third images, and wherein the first, second and third images are co-registered. The method comprises further obtaining intrinsic and/or extrinsic parameter values for at least one imaging device used for capture of the first image from the first viewpoint, the second image from the second viewpoint and the third image from the third viewpoint, and determining the 3D coordinates describing the scene, the determination comprising performing bundle-adjustments based on pairwise measurements on the first, second and third images so as to minimize a re-projection error of reconstructed 3D points in the overlapping geographical area of the first, second and third images, the performing of bundle adjustments comprising refining positions of the reconstructed 3D points and at least some of the obtained intrinsic and/or extrinsic parameter values, wherein time is used as a parameter in the determination of the 3D coordinates describing the scene, and wherein the re-projection error is minimized allowing a height to be locally time dependent in reconstruction of 3D points at least for a part of the overlapping geographical area.

Thus, time is used as a parameter in the determination of the 3D coordinates describing the scene. Thereby, a height of the reconstructed 3D points can be treated as being a variable at least for a part of the overlapping geographical area. By reconstructing 3D points as defined herein, a possible change between the images is an additional parameter taking into consideration in the optimization problem, i.e. it is assumed that the actual height may be different at at least a part of the first, second and third images.

Allowing a height difference when minimizing the re-projection error enables more correct height determinations. Further, parts of a scene having time dependent characteristics can be identified. Thus, different types of vegetation, such as forests, can be identified in an otherwise static scene. Classification of land types can then be made for such identifications.

Also, other types of changes can be identified by allowing the height to be locally time dependent. Sliding movements/changes such as earthquakes and shrinking/growing glaciers can be identified. The sliding movement is characteristically extending along a plane of the earth.

Further, when minimizing the re-projection error while using time as a parameter in the determination of the 3D coordinates describing the scene, the values of global parameters, characteristically at least some of the extrinsic parameters, can be refined. Thus, the herein described method can be used for improving the values of extrinsic and/or intrinsic parameter values for the at least one image capturing device used to capture the first, second and third images.

The extrinsic parameters of a camera depend on its location and orientation. The intrinsic parameters of a camera depend on how the camera captures the images. Parameters such as focal length, aperture, field-of-view, resolution, etc govern the intrinsic matrix of a camera model.

Characteristically, the first, second and third viewpoints need to be known to some extent. This means that (extrinsic parameter) values for imaging device coordinates and a pointing direction of the imaging device are associated to the respective image. However, these values, or a selected subset of these values, can be adjustable by the algorithm. Thus, the adjustable values can be adjusted during processing of minimizing the re-projection error.

The third viewpoint can be different from the first and second viewpoints.

The first, second and third images are characteristically two-dimensional images.

The first and/or the second image and/or the third image may be a satellite image.

The method is described in relation to a first, second and third image. However, in practice, more images may be used.

The re-projection error may be minimized allowing a local height difference representing an increased height between a first timing corresponding to capture of the first image and subsequent second and third timings corresponding to capture of the second image and the third image, respectively.

The method can then be used for identification of forest areas and/or determination of characteristics of such forest areas.

The method may further comprise obtaining a first point in time at which the first image was captured, obtaining a second point in time at which the second image was captured and obtaining a third point in time at which the third image was captured, wherein any reconstructed 3D point with an identified local height difference between the first, second and third points in time is also associated to information relating to the first, second and third points in time.

For example, a rate of change may then be determined based on the identified height difference between the first, second and third points in time and the information relating to the first, second and third points in time. The rate of change may be a growth value representative of a growth per time unit.

The method may further comprise a step of estimating a height value for a fourth point in time based on the determined rate of change and based on said first and/or second and/or third points in time.

The computer-implemented method may comprise indicating that there is a height uncertainty for 3D coordinates for which a height difference in the reconstructed 3D points has been identified or for which a height difference has been determined to lie outside an expected behaviour. This may occur for example if a change with time does not follow any expected behaviour, such as continuously increasing height or a discontinuous change such as occurrence/disappearance of objects such as buildings.

The computer-implemented method may comprise a step of refining at least one of the obtained intrinsic and/or extrinsic parameter values.

The computer-implemented method may comprise indicating a scene change for 3D coordinates for which a height difference in the reconstructed 3D points has been identified or for which a height difference having predetermined change characteristics has been identified or for which a difference in the xy plane has been identified.

According to some embodiments, the method further comprises determining whether an identified height difference between the first, second and third timings follows an expected behaviour, wherein the expected behaviour is comprised in the group comprising at least one of

- the height is continuously increasing,
- the identified height difference follows a multimodal distribution, such as a bimodal distribution,
- the height distribution over an area follows a sliding movement/change over time indicating presence of for example an earthquake and/or a shrinking/growing glacier, and
- the height distribution follows any predetermined distribution.

According to some embodiments, the computer-implemented method comprises storing the determined 3D coordinates describing the scene, wherein the stored determined 3D coordinates may comprise

- more than one height value and possibly a rate of change for at least a part of the 3D coordinates for which a height difference in the reconstructed 3D points has been identified and/or
- an indication that the there is a height uncertainty for at least a part of the 3D coordinates for which a height difference in the reconstructed 3D points has been identified and/or
- an indication that there has been a scene change at least a part of the 3D coordinates for which a height difference in the reconstructed 3D points has been identified.

According to a second aspect there is provided a computer program comprising a program code for performing the computer-implemented method as disclosed herein.

According to a third aspect there is provided a computer program product comprising a program code stored on a computer readable media for performing the method as disclosed herein.

According to a fourth aspect there is provided a device for determining 3D coordinates describing a scene, the device comprising a memory arranged to store images and a processor arranged to obtain a first image covering the scene captured from a first viewpoint, the first image being associated to a first timing of capture, obtaining a second image covering the scene captured from a second viewpoint different than the first viewpoint, the second image being associated to a second timing of capture, the second timing being different than the first timing, obtaining least one third image covering the scene captured from a third viewpoint, the third image being associated to a third timing of capture, the third timing being different than the first and second timings, wherein the scene is formed in an overlapping geographical area of the first, second and third images, and wherein the first, second and third images are co-registered. The method comprises further obtain intrinsic and/or extrinsic parameter values for at least one imaging device used for capture of the first image from the first viewpoint, the second image from the second viewpoint and the third image from the third viewpoint, and determine the 3D coordinates describing the scene, the determination comprising performing bundle-adjustments based on pairwise measurements on the first, second and third images so as to minimize a re-projection error of reconstructed 3D points in the overlapping geographical area of the first, second and third images, the performing of bundle adjustments comprising refining positions of the reconstructed 3D points and at least some of the obtained intrinsic and/or extrinsic parameter values, wherein time is used as a parameter in the determination of the 3D coordinates describing the scene, and wherein the re-projection error is minimized allowing a height to be locally time dependent in reconstruction of 3D points at least for a part of the overlapping geographical area.

According to a fifth aspect there is provided a display device for display of information relating to 3D coordinates describing a scene, the display device comprising a display for display of the information and a memory storing data provided by a device for determining 3D coordinates describing a scene as disclosed herein.

Effects and features of the second through fifth aspects are to a large extent analogous to those described above in connection with the first aspect. Embodiments mentioned in relation to the first aspect are largely compatible with the second through fifth aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of examples, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed examples. The disclosed examples are provided to fully convey the scope of the disclosure to the skilled person.

Figure 1:
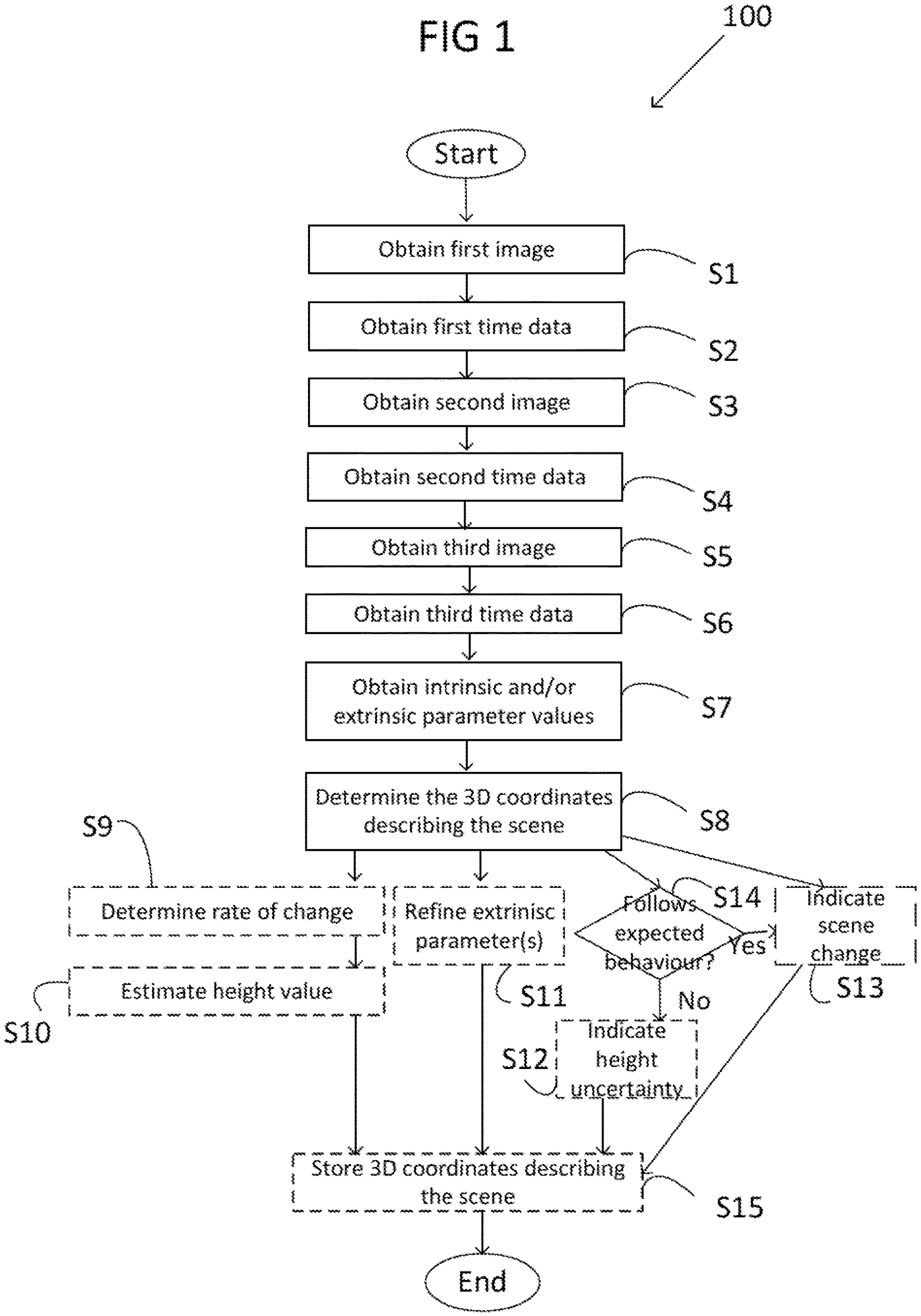
FIG. 1 shows a flow chart illustrating an example of a computer-implemented method for determined 3D coordinates describing a scene.

FIG. 1 shows a computer-implemented method 100 for determining 3D coordinates describing a scene.

The computer-implemented method 100 comprises obtaining S1 a first image covering the scene captured from a first viewpoint, the first image being associated to a first timing of capture.

The computer-implemented method may comprise obtaining S2 a first point in time at which the first image was captured.

The computer-implemented method 100 further comprises obtaining S3 a second image covering the scene captured from a second viewpoint different than the first viewpoint, the second image being associated to a second timing of capture, the second timing being different than the first timing.

The computer-implemented method 100 may comprise obtaining S4 a second point in time at which the second image was captured.

The computer-implemented method 100 further comprises obtaining S5 at least one third image covering the scene captured from a third viewpoint, the third image being associated to a third timing of capture, the third timing being different than the first and second timings. The third viewpoint may be different than the first and second viewpoints.

The computer-implemented method 100 may comprise obtaining S6 a third point in time at which the third image was captured.

Thus, the scene for which 3D coordinates are to be described is formed in an overlapping geographical area of the first, second and third images. The first, second and third images are co-registered.

The obtained first, second and third images are characteristically two-dimensional images. The obtained first, second and third images are characteristically digital images comprising a plurality of pixels each having a pixel value. The obtained first image and/or the second image and/or the third image may be a satellite image.

The method further comprising obtaining S7 intrinsic and/or extrinsic parameter values for at least one imaging device used for capture of the first image from the first viewpoint, the second image from the second viewpoint and the third image from the third viewpoint.

The obtained intrinsic and/or extrinsic parameter values comprise at least viewpoint data, i.e. the respective image is associated to an imaging device coordinate value and a pointing direction value. In practice, this means that the first, second and third viewpoints are known to some extent. However, these values, or a selected subset of these values, can be adjustable. Thus, the adjustable values can be adjusted during a process of minimizing a re-projection error. Thus, if the viewpoint coordinate value and/or pointing direction value is uncertain, these values can be adjusted. This means that images from satellites where the viewpoint coordinate values and/or pointing direction values are uncertain, these satellite images can still be used in the method as discussed herein. The process of minimizing the re-projection error will be described more in detail below.

As the intrinsic and/or extrinsic parameter values including satellite viewpoints are generally known, this information can be used geo-reference the obtained images. This means that the obtained satellite images are each associated to coordinate data in a global coordinate system, wherein 2D positions on the ground are given as latitude and longitude or equivalents thereof. The coordinate data may be two-dimensional or three-dimensional.

The method further comprises determining S8 the 3D coordinates describing the scene. The determination comprises performing bundle-adjustments based on pair-wise measurements on the first, second and third images so as to minimize a re-projection error of reconstructed 3D points in the overlapping geographical area of the first, second and third images.

In photogrammetry and computer stereo vision, bundle adjustment refers to simultaneous refining of the 3D coordinates describing the scene geometry, the parameters of the relative motion, and the optical characteristics of the imaging device(s) employed to acquire the images, given a set of images depicting a number of 3D points from different viewpoints. The name bundle adjustment refers to the geometrical bundles of light rays originating from each 3D feature and converging on each imaging device's optical center, which are adjusted optimally according to an optimality criterion involving the corresponding image projections of all points.

The performing of bundle adjustments as discussed herein may be made using methods known in the art and involving refining positions of the reconstructed 3D points and at least some of the obtained intrinsic and/or extrinsic parameter values to minimize the re-projection error of reconstructed 3D points. For example, the refining of positions of the intrinsic/and or extrinsic parameter values may involve refining coordinate values and/or pointing direction values for at least some of the images used.

However, in accordance with the solution as presented herein, time is used as a parameter in the determination of the 3D coordinates describing the scene. This means that the re-projection error is minimized allowing a height to be locally time dependent in reconstruction of 3D points at least for a part of the overlapping geographical area.

The term "locally time dependent" in the context of the present disclosure means that the height is time dependent in a one or a plurality of parts of an overlapping area for the first, second and third images. Thus, characteristically, the height is not time dependent in the whole overlapping area.

Even changes such as earthquakes and glaciers can be identified by allowing the height to be locally time dependent.

The re-projection error may be minimized allowing a height difference representing an increased height between a first timing corresponding to capture of the first image and subsequent second and third timings corresponding to capture of the second image and the third image, respectively.

Further, the computer-implemented method 100 may further comprise a step of determining (S9) a rate of change based on the identified height difference between the first, second and third points in time and the information relating to the first and second points in time. The rate of change may be a growth value representative of a growth per time unit.

The computer-implemented method 100 may further comprise a step of estimating S10 a height value for a fourth point in time based on the determined rate of change and based on said first and/or second and/or third points in time.

The computer-implemented method 100 may further comprise indicating S12 that there is a height uncertainty for 3D coordinates for which a height difference in the reconstructed 3D points has been identified.

The computer-implemented method may comprise a step of determining S14 whether an identified height difference is outside an expected behaviour, for example determining whether a change with time does not follow an expected behaviour, such as continuously increasing height or a discontinuous change such as occurrence/disappearance of objects such as buildings. When it has been determined that the identified height difference is outside an expected behaviour, it may be indicated S12 that there is a height uncertainty.

The computer-implemented method 100 may comprise determining S14 whether an identified height difference between the first, second and third timings follows an expected behaviour. The expected behaviour may be comprised in the group comprising at least one of

- the height is continuously increasing,
- the identified height difference follows a multimodal such as a bimodal distribution,
- the height distribution over an area follows a sliding movement/change over time indicating presence of for example an earthquake and/or a shrinking/growing glacier, and
- the height distribution follows any predetermined distribution.

The computer-implemented method may further comprise refining S11 at least one of the obtained intrinsic and/or extrinsic parameter values. This has been discussed above.

The computer-implemented method may further comprise storing S15 the determined 3D coordinates describing the scene, wherein at least some of the stored determined 3D coordinates may comprise

- more than one height value and possibly a rate of change for at least a part of the 3D coordinates for which a height difference in the reconstructed 3D points has been identified and/or
- additional information indicating that there is a height uncertainty for at least a part of the 3D coordinates for which a height difference in the reconstructed 3D points has been identified. Optionally, this height uncertainty is indicated when the height difference does not follow an expected behaviour, for example one of those discussed above and/or
- additional information indicating S13 that there has been a scene change for at least a part of the 3D coordinates for which a height difference in the reconstructed 3D points has been identified. For example, the indication of the scene change may be made upon determination that the height difference follows an expected behaviour.

Figure 2:
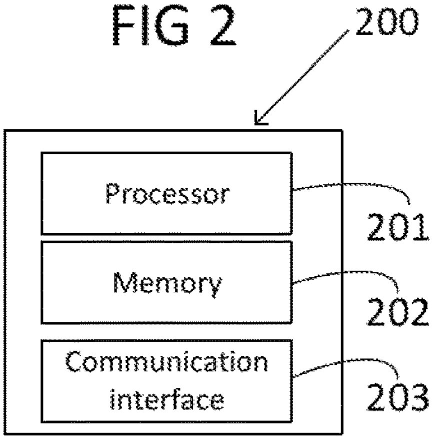
FIG. 2 shows a block scheme schematically illustrating an example of a device for determining 3D coordinates describing a scene.
Figure 4:
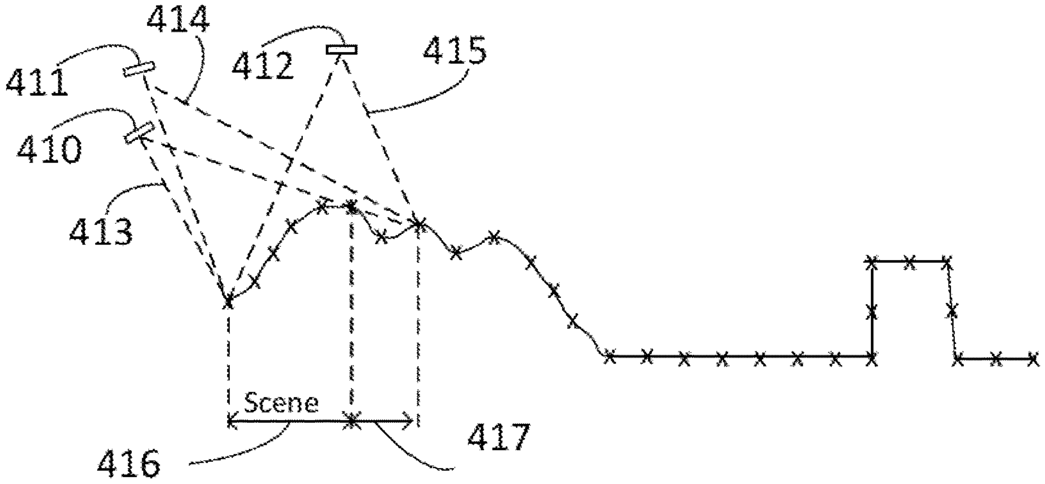
FIG. 4 is a schematic illustration of an example of a scene for which 3D coordinates describing the scene are determined.
Figure 5A:
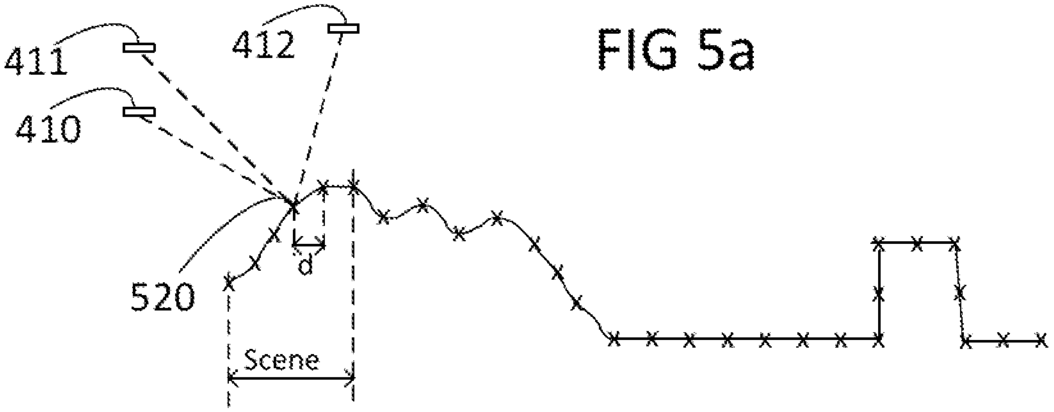
FIGS. 5*a*-5*c* is a schematic illustration of the principles for determining 3D coordinates describing a scene using three images.

FIG. 2 illustrates a device 200 for determining 3D coordinates describing a scene, the device comprises a processor 201. The device comprises or is connected to at least one memory 202. The processor 201 is arranged to execute program instructions to execute the computer-implemented method as disclosed herein in relation to FIG. 1. Principles for processing using the device 200 are illustrated in FIGS. 4 and 5.

The at least one memory 202 may store the program instructions. The at least one memory 202 may comprise an image library storing images such as satellite images for use in determination of the 3D coordinates describing a scene. The at least one memory may store the determined coordinates describing the scene. Especially, some of the stored determined 3D coordinates may comprise

- more than one height value and possibly a rate of change for at least a part of the 3D coordinates for which a height difference in the reconstructed 3D points has been identified and/or
- additional information indicating that there is a height uncertainty for at least a part of the 3D coordinates for which a height difference in the reconstructed 3D points has been identified and/or
- additional information indicating that there has been a scene change at least a part of the 3D coordinates for which a height difference in the reconstructed 3D points has been identified.

The device 200 for determining 3D coordinates describing a scene may further comprise a communication interface 203. The device 200 may receive images for use in determining the 3D coordinates describing the scene via the communication interface 203. The received images may be stored in the image library or processed upon reception. Further, the device 200 may transmit via the communication interface 203 information relating to the results of the processing by the processor 201. The results may be obtained from the at least one memory 202.

Figure 3:
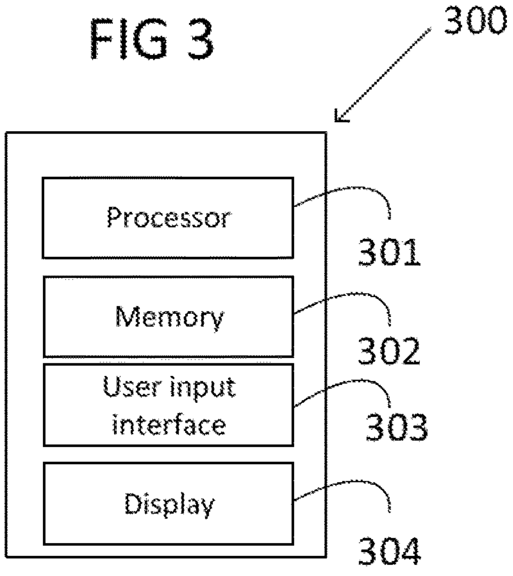
FIG. 3 shows a block scheme schematically illustrating an example of a display device for display of information relating to 3D coordinates describing a scene

FIG. 3 shows a display device 300 for display of information relating to 3D coordinates describing a scene. The display device 300 comprising a display 304 for display of the information.

The display device 300 comprises or is connected to at least one memory 302. The memory 302 stores data provided by a device 200 for determining 3D coordinates describing a scene for example as discussed in relation to FIG. 2.

The display device 300 may further comprise a user input interface 303 such as a touch screen, keyboard, mouse, or the like for user input of a request for information.

Characteristically, a processor 301 controls retrieval of data from the memory 302, processing of user input request to find requested information relating to the determined 3D coordinates describing the scene.

FIG. 4 illustrates an example wherein at least one image capture device has been used for obtaining at least three images covering a scene 416 from at least three different image capture device postures (position and bearing) or viewpoints 410, 411, 412. A platform supporting the at least one image capture device may for example be a satellite or an aircraft of any type. Different images may have been captured from image capture devices supported on different platforms. For example, all of the images may be satellite images either captured with the same or different image capture devices. Alternatively, some of the images are satellite images. Alternatively, all images are captured with the same or different image capture devices supported on at least one platform of another type, such as an aircraft.

The images are captured from different postures or viewpoints in relation to the scene 416. As stated above, different image capture devices may have captured the different images, or the same image capture device may have been used. In the latter case, the platform on which the image capture device is supported has moved between the different viewpoints.

The image capture device(s) at the respective posture or viewpoint 410, 411, 412 has each a field of view 413, 414, 415. The scene 416 covered by the images is a part of the geography within the field of view of the image capture device(s) from all three postures or viewpoints which is also visible in all three images. Thus, in the illustrated example, the part 417 is not part of the scene as this part is obscured and thus not visible from a first viewpoint 410 of the viewpoints 410, 411, 412 and partly obscured and thus partly not visible from a second viewpoint 411 of the viewpoints 401, 411, 412.

FIGS. **5*a*-5*c*** illustrate schematically principles for determining 3D coordinates describing a scene using three images.

A first image has been obtained covering a scene captured from a first viewpoint. The first image is associated to a first timing of capture. Further, a second image covering the scene captured from a second viewpoint different than the first viewpoint has been obtained. The second image is associated to a second timing of capture, said second timing being different than the first timing. Further, at least one third image covering the scene captured from a third viewpoint has been obtained. The at least one third image is associated to a third timing of capture, said third timing being different than the first and second timings. The third viewpoint may be different than the first and second viewpoints.

The scene covered by the images is a part of the geography within the field of view of image capture device(s) from all three postures or viewpoints which is also visible in all three images. The scene further illustrated in relation to FIG. 4.

The first, second and third images are co-registered. The first, second, and third images are preferably geo-referenced.

Each image comprises a plurality of points or pixels. A typical distance d between the points or pixels may be between 30 and 300 cm, for example 100-150 cm or 50-130 cm for satellite-based images. For airborne images, the scale may be different.

Each or a plurality of the points or pixel has a corresponding point or pixel in the other two images. It is assumed that this correspondence between the images has been established. The correspondence may have been pair-wise established. Thus, the correspondence between points/pixels between the first and second images have been established, the correspondence between points/pixels between the first and third images have been established and the correspondence between points/pixels between the second and third images have been established.

Figure 5B:
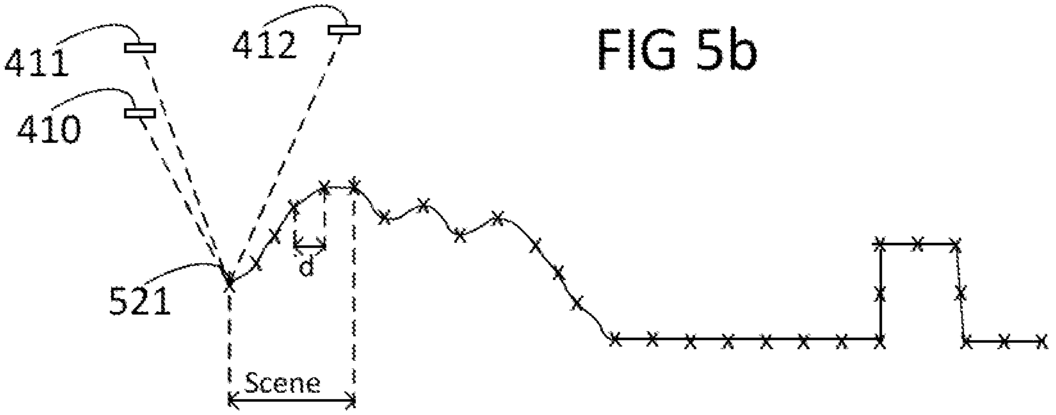
Figure 5C:
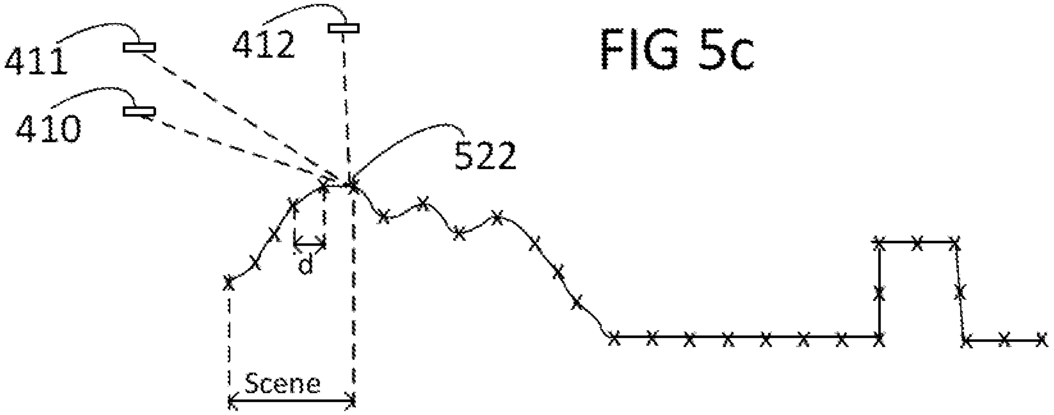

In the illustrated example, FIG. **5*a* illustrates a first 3D coordinate in the scene associated to a first point/pixel 520 in each of the images for which correspondence between the images has been established. Further, FIG. 5*b* illustrates a second 3D coordinate in the scene associated to a second point/pixel 521 in each of the images for which correspondence between the images has been established. Further, FIG. 5*c* illustrates a third 3D coordinate in the scene associated to a third point/pixel 522** in each of the images for which correspondence between the images has been established.

The same correspondence may have been established for all of the points/pixels (denoted "x") of the images, which points/pixels are within the scene or a subset of the points/pixels of the images within the scene.

For each point/pixel 520, 521, 522 in each of the images for which correspondence between the images has been established, the 3D coordinate describing the scene is determined. The determination comprising performing bundle-adjustments based on pair-wise measurements on the first, second and third images so as to minimize a re-projection error of reconstructed 3D points in the overlapping geographical area of the first, second and third images, said performing of bundle adjustments comprising refining positions of the reconstructed 3D points and at least intrinsic and/or extrinsic parameter values. Time is used as a parameter in the determination of the 3D coordinates describing the scene. The re-projection error is minimized allowing a height to be locally time dependent in reconstruction of 3D points at least for a part of the overlapping geographical area. The determined 3D points are characteristically geo-referenced.

For some determined 3D points, the height may have been changed and for other 3D points the height may not have changed between capture of the images.

Figure 6:
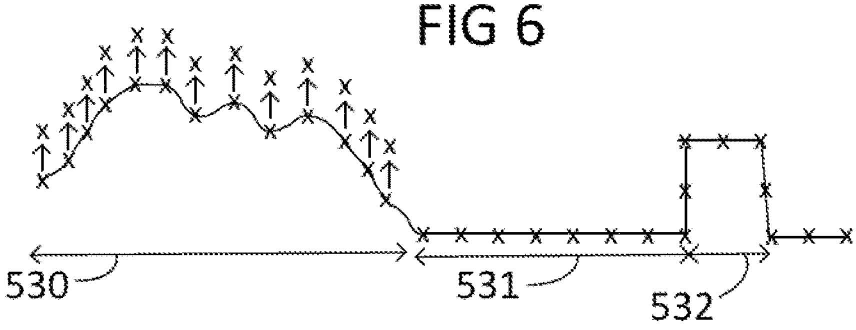
FIG. 6 is a schematic illustration of a geography containing different types of characteristics.

FIG. 6 illustrates different scenarios in a landscape. A 3D representation of the landscape has been provided from the determination of the 3D coordinates for one scene as disclosed herein or from the determination of the 3D coordinates for a plurality of scenes each determined as disclosed herein. Characteristically, a large number of images of the landscape are available from different timings. Some of the images are used for determined the 3D coordinates of one scene and other images are used for determination of the 3D coordinates for other scenes.

For a first part 530 of the landscape, a height of the reconstructed 3D points is varying with time. The variation with time can be the same within this first part or it can change with the location in this first part 530. When the height changes with time, it may for example change in a way which is characteristic for a growing forest. Thus, different types of vegetation, such as forests, can be identified or used as a feature in a Land Use/Land Cover, LULC, classifier. Classification of land types can then be made for such identifications.

For a second part 531 of the landscape, the reconstructed 3D points are characteristically not varying with time. Such parts of the geography are suitable for refinement of the values of values of global parameters, characteristically at least some of the extrinsic parameters of an image capturing device which has captured the image.

For a third part 532 of the landscape, a variation with time is characteristically not continuous. For example, a house may be present at one timing and the, at a next timing the house has been torn down. Or alternatively, the house is not there at one timing and at the next it has been built Also, other types of changing areas can be identified, such as earthquakes and glaciers by allowing the height to be time dependent.

However, the method as disclosed herein defines that the height is allowed to be locally time dependent. This means that the method does not allow all parts of the landscape to have height changing with time.

Thus, different types of changes can be identified, and classification of land types can then be made for such identifications.

Which types of changes can be identified depends on the model used for the time dependency. For example, the time dependency can relate only to height or also to the x and y axes. Further, the time dependency can be modelled to

- be continuously varying over time and/or
- allow for discrete jumps, i.e., a multimodal, such as bimodal, behaviour, can be allowed. An example of a bimodal behaviour is for example sudden occurrence and/or removal of an object such as a building. An example of a multimodal behaviour is for example occurrence, removal, and reappearance of an object such as a building, and/or
- allow for any other predetermined behaviour.

The various aspects, embodiments, implementations or features of the described embodiments can be used separately or in any combination. Various aspects of the described embodiments can be implemented by software, hardware or a combination of hardware and software. The methods and operations may be implemented in some embodiments in a computer readable medium, which is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The person skilled in the art realizes that the present disclosure is not limited to the examples described above. The person skilled in the art further realizes that modifications and variations are possible within the scope of the appended claims. Additionally, variations to the disclosed examples can be understood and effected by the skilled person in practicing the claimed disclosure, from a study of the drawings, the disclosure, and the appended claims.

What is claimed is:

1. A method for determining 3D coordinates describing a scene, the method comprising:

obtaining a first image covering the scene captured from a first viewpoint, the first image being associated to a first timing of capture;

obtaining a second image covering the scene captured from a second viewpoint different than the first viewpoint, the second image being associated to a second timing of capture, the second timing being different than the first timing;

obtaining at least one third image covering the scene captured from a third viewpoint, the third image being associated to a third timing of capture, the third timing being different than the first and second timings, wherein the scene is formed in an overlapping geographical area of the first, second, and third images and wherein the images are co-registered;

obtaining an intrinsic parameter value(s) and/or an extrinsic parameter value(s) for at least one imaging device used for capture of the first image from the first viewpoint, the second image from the second viewpoint, and the third image from the third viewpoint; and determining the 3D coordinates describing the scene, wherein determining the 3D coordinates comprises performing bundle adjustments based on pair-wise measurements on the first, second, and third images so as to minimize a re-projection error of reconstructed 3D points in the overlapping geographical area of the first, second, and third images, wherein performing bundle adjustments comprises refining positions of the reconstructed 3D points and at least some of the obtained intrinsic parameter value(s) and/or extrinsic parameter value(s), wherein time is used as a parameter in the determination of the 3D coordinates describing the scene, and wherein the re-projection error is minimized allowing a height to be locally time dependent in reconstruction of 3D points at least for a part of the overlapping geographical area.

2. The method of claim 1, wherein at least one of the first image, the second image, and/or the third image is a satellite image.

3. The method of claim 1, wherein the re-projection error is minimized allowing a local height difference representing an increased height between a first timing corresponding to capture of the first image and subsequent second and third timings corresponding to capture of the second image and the third image, respectively.

4. The method of claim 1, further comprising:

obtaining a first point in time at which the first image was captured;

obtaining a second point in time at which the second image was captured; and obtaining a third point in time at which the third image was captured, wherein any reconstructed 3D point with an identified local height difference between the first, second and third points in time is also associated to information relating to the first, second, and third points in time.

5. The method of claim 4, wherein a rate of change is determined based on the identified height difference between the first, second, and third points in time and the information relating to the first, second, and third points in time.

6. The method of claim 5, wherein the rate of change is a growth value representative of a growth per time unit.

7. The method of claim 5, further comprising estimating a height value for a fourth point in time based on the determined rate of change and based on at least one of the first, the second, and/or third points in time.

8. The method of claim 1, further comprising indicating that there is a height uncertainty for at least some 3D coordinates for which a height difference in the reconstructed 3D points has been identified.

9. The method of claim 1, further comprising refining of at least one of the obtained intrinsic and/or extrinsic parameter values.

10. The method of claim 1, further comprising indicating a scene change for at least some 3D coordinates for which a height difference in the reconstructed 3D points has been identified.

11. The method of claim 1, further comprising determining whether an identified height difference between the first, second and third timings follows an expected behavior, wherein the expected behavior comprises at least one of:

the height is continuously increasing, the identified height difference follows a multimodal distribution, the height distribution over an area follows a sliding movement over time, and/or the height distribution follows any predetermined distribution.

12. The method of claim 1, further comprising storing the determined 3D coordinates describing the scene, wherein at least some of the stored determined 3D coordinates comprise at least one of:

more than one height value and a rate of change for at least a part of the 3D coordinates for which a height difference in the reconstructed 3D points has been identified, addition information indicating that there is a height uncertainty for at least a part of the 3D coordinates for which a height difference in the reconstructed 3D points has been identified, and/or additional information indicating that there has been a scene change in at least a part of the 3D coordinates for which a height difference in the reconstructed 3D points has been identified.

13. A system for determining 3D coordinates describing a scene, the system comprising:

a memory storage; and a processing unit coupled to the memory storage, wherein the processing unit is operative to:

obtain a first image covering the scene captured from a first viewpoint, the first image being associated to a first timing of capture;

obtain a second image covering the scene captured from a second viewpoint different than the first viewpoint, the second image being associated to a second timing of capture, the second timing being different than the first timing;

obtain at least one third image covering the scene captured from a third viewpoint, the third image being associated to a third timing of capture, the third timing being different than the first and second timings, wherein the scene is formed in an overlapping geographical area of the first, second, and third images and wherein the images are co-registered;

obtain at least one of intrinsic and/or extrinsic parameter values for at least one imaging device used for capture of the first image from the first viewpoint, the second image from the second viewpoint, and the third image from the third viewpoint; and determine the 3D coordinates describing the scene, wherein determining the 3D coordinates comprises performing bundle adjustments based on pair-wise measurements on the first, second, and third images so as to minimize a re-projection error of reconstructed 3D points in the overlapping geographical area of the first, second, and third images, wherein performing of bundle adjustments comprises refining positions of the reconstructed 3D points and at least some of the obtained intrinsic and extrinsic parameter values, wherein time is used as a parameter in the determination of the 3D coordinates describing the scene, and wherein the re-projection error is minimized allowing a height to be locally time dependent in reconstruction of 3D points at least for a part of the overlapping geographical area.

14. The system of claim 13, wherein at least one of the first image, the second image, and/or the third image is a satellite image.

15. The system of claim 13, wherein the re-projection error is minimized allowing a local height difference representing an increased height between a first timing corresponding to capture of the first image and subsequent second and third timings corresponding to capture of the second image and the third image, respectively.

16. The system of claim 13, wherein the processing unit is further operative to:

obtain a first point in time at which the first image was captured;

obtain a second point in time at which the second image was captured; and obtain a third point in time at which the third image was captured, wherein any reconstructed 3D point with an identified local height difference between the first, second, and third points in time is also associated to information relating to the first, second, and third points in time.

17. A non-transitory computer-readable medium that stores a set of instructions which when executed perform a method for determining 3D coordinates describing a scene, the method executed by the set of instructions comprising:

obtaining a first image covering the scene captured from a first viewpoint, the first image being associated to a first timing of capture;

obtaining a second image covering the scene captured from a second viewpoint different than the first viewpoint, the second image being associated to a second timing of capture, the second timing being different than the first timing;

obtaining at least one third image covering the scene captured from a third viewpoint, the third image being associated to a third timing of capture, the third timing being different than the first and second timings, wherein the scene is formed in an overlapping geographical area of the first, second, and third images and wherein the images are co-registered;

obtaining at least one of intrinsic and/or extrinsic parameter values for at least one imaging device used for capture of the first image from the first viewpoint, the second image from the second viewpoint, and the third image from the third viewpoint; and determining the 3D coordinates describing the scene, wherein determining the 3D coordinates comprises performing bundle adjustments based on pair-wise measurements on the first, second, and third images so as to minimize a re-projection error of reconstructed 3D points in the overlapping geographical area of the first, second, and third images, wherein performing bundle adjustments comprises refining positions of the reconstructed 3D points and at least some of the obtained intrinsic and extrinsic parameter values, wherein time is used as a parameter in the determination of the 3D coordinates describing the scene, and wherein the re-projection error is minimized allowing a height to be locally time dependent in reconstruction of 3D points at least for a part of the overlapping geographical area.

18. The non-transitory computer-readable medium of claim 17, wherein at least one of the first image, the second image, and/or the third image is a satellite image.

19. The non-transitory computer-readable medium of claim 17, wherein the re-projection error is minimized allowing a local height difference representing an increased height between a first timing corresponding to capture of the first image and subsequent second and third timings corresponding to capture of the second image and the third image, respectively.

20. The non-transitory computer-readable medium of claim 17, further comprising:

obtaining a first point in time at which the first image was captured;

obtaining a second point in time at which the second image was captured; and obtaining a third point in time at which the third image was captured, wherein any reconstructed 3D point with an identified local height difference between the first, second, and third points in time is also associated to information relating to the first, second, and third points in time.

* * * * *